United States Patent
Bacher et al.

(10) Patent No.: US 6,567,580 B2
(45) Date of Patent: May 20, 2003

(54) OPTICAL COMBINER SYSTEM AND METHOD

(75) Inventors: Kenneth L. Bacher, Macungie, PA (US); William C. Dautremont-Smith, Orefield, PA (US)

(73) Assignee: Triquint Technology Holding Co., Hillsboro, OR (US)

( * ) Notice: Subject to any disclaimer, the term of this patent is extended or adjusted under 35 U.S.C. 154(b) by 97 days.

(21) Appl. No.: 09/774,799

(22) Filed: Feb. 1, 2001

(65) Prior Publication Data

US 2002/0102049 A1 Aug. 1, 2002

(51) Int. Cl.$^7$ .............................. G02B 6/28; H04J 14/02
(52) U.S. Cl. .............................. 385/24; 385/42; 385/45; 359/128; 359/124; 359/115
(58) Field of Search ........................ 356/73.1; 359/128, 359/124, 115; 385/24, 42, 45

(56) References Cited

U.S. PATENT DOCUMENTS

| | | | |
|---|---|---|---|
| 5,251,001 A | * 10/1993 | Dave et al. ................ | 356/73.1 |
| 5,673,129 A | 9/1997 | Mizrahi | |
| 5,793,508 A | 8/1998 | Meli | |
| 5,847,862 A | 12/1998 | Chraplyvy et al. | |
| 6,041,070 A | 3/2000 | Koch et al. | |
| 6,081,369 A | 6/2000 | Waarts et al. | |
| 6,111,676 A | * 8/2000 | Lemus et al. ................ | 359/110 |
| 6,122,043 A | * 9/2000 | Barley ........................ | 356/73.1 |
| 6,240,109 B1 | * 5/2001 | Shieh ........................... | 372/18 |
| 6,278,813 B1 | * 8/2001 | Takada et al. ................ | 385/24 |
| 6,373,867 B1 | * 4/2002 | Lin et al. ..................... | 372/18 |

* cited by examiner

*Primary Examiner*—Michael P. Stafira
*Assistant Examiner*—Juan D Valentin, II
(74) *Attorney, Agent, or Firm*—Dickstein Shapiro Morin & Oshinsky LLP

(57) ABSTRACT

A broadband partial reflector is located downstream from an optical combiner device. The partial reflector reflects a portion of the combined light back through the combiner device and back into the respective optical pump sources. There are no fiber gratings or other filters between the sources and the combiner device. Consequently, the sources are locked and/or stabilized according to the acceptance bandpass characteristics of the input ports of the combiner device. Since no gratings or other filters need to be located between the sources and the combiner device, the problem of insertion power loss due to spectral mismatch at the input ports can be avoided. In other words, self-aligned wavelength feedback stabilization is accomplished by reflecting a portion of the combined light signal back through the input ports of the combiner device.

18 Claims, 1 Drawing Sheet

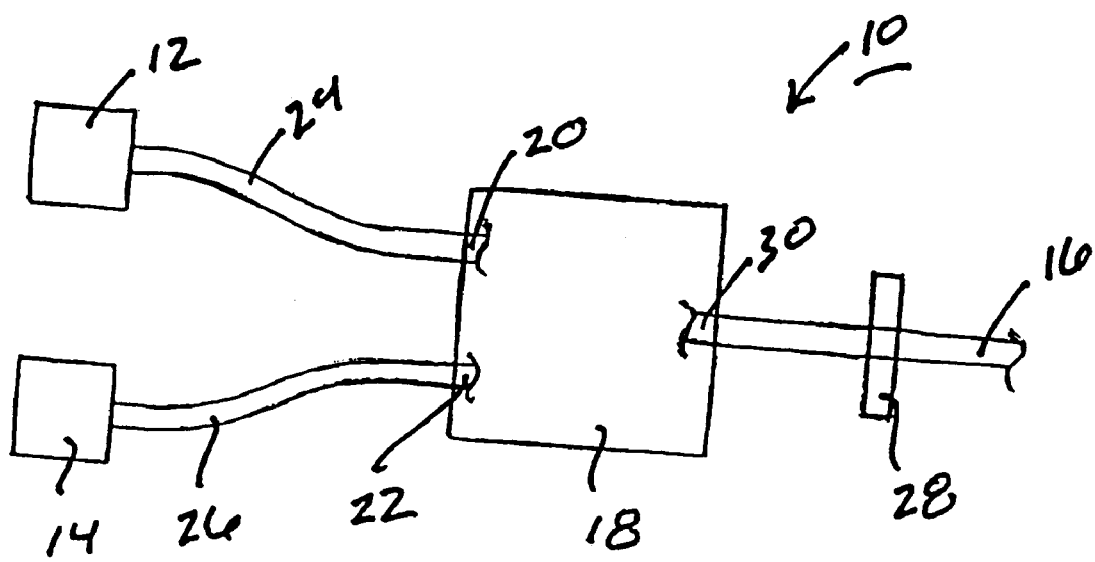

OPTICAL COMBINER SYSTEM AND METHOD

BACKGROUND OF THE INVENTION

1. Field of the Invention

The present invention relates generally to optical devices and systems, especially to telecommunications systems, optical amplifier systems, and/or wavelength division multiplexing systems. The present invention also relates to devices for combining multiple optical input signals into one or more combined signals.

2. Description of the Related Art

Optical combiner devices are generally known. Such devices may be used to receive multiple pump signals via respective input ports and to combine the pump signals into an output signal. The input signals may have different operational wavelengths. The combined signal may be used to energize an optical amplifier, for example.

It has been suggested to locate fiber gratings upstream from the input ports of the combiner device to control and/or stabilize the wavelengths of the respective optical sources. One problem with this approach, however, is that it can be difficult to match the wavelength characteristics of the fiber gratings to the acceptance bandpass characteristics of the input ports. The spectral misalignment can be caused by normal manufacturing variations, by temperature variations, and by other factors. Any misalignment between the spectral characteristics of the gratings and the input ports of the combiner device can result in a loss of optical efficiency.

SUMMARY OF THE INVENTION

The present invention overcomes the problems of the prior art by providing a broadband partial reflector downstream from the combiner device. The partial reflector reflects a portion of the combined light signal back through the combiner device and back into the optical sources. There are no fiber gratings or other spectral filters between the sources and the combiner device. Consequently, the sources are locked and/or stabilized according to the acceptance bandpass characteristics of the input ports of the combiner device. In other words, the combiner device itself provides the spectral filters for feedback-controlling the wavelength characteristics of the sources. Since no gratings or other filters need to be located between the sources and the combiner device, the problem of power loss due to spectral mismatch at the input ports can be avoided.

In a preferred embodiment of the invention, an optical waveguide, such as an optical fiber, is used to transmit the combined light signal away from the combiner device, and the partial reflector is located within the waveguide or between the waveguide and the combiner device. That is, the partial reflector is located optically downstream from the combiner device. The partial reflector, together with the filtering properties of the combiner device (especially the input ports), causes the wavelengths of the input sources to be locked as a function of the acceptance bandpass characteristics of the respective input ports. In a preferred embodiment of the invention, the laser sources are locked to the different wavelengths of the input ports to support the most efficient transmission of optical power through the combiner device. The present invention should not be limited, however, to the preferred embodiments shown and described in detail herein.

The present invention also relates to a method of efficiently combining input light signals into a combined light signal. The method operates without any fiber gratings or other spectral filtering devices between the sources and the combiner device. Instead of gratings in the input fibers, the invention provides wavelength feedback stabilization by reflecting a portion of the combined light signal back through the input ports of the combiner device. The method operates to self-align the operational wavelengths of the laser sources to the acceptance bandpass characteristics of the input ports.

In a preferred embodiment of the invention, a single broadband feedback element is located after (downstream from) the combiner device. Thus, the combiner device may be located between the pump lasers and the broadband feedback element. The passbands of the combiner device (through the respective input ports) determine the wavelengths of the feedback light provided to the lasers, such that the lasing wavelengths are at the minimum loss wavelengths associated with the combiner device. Thus, efficient wavelength locking can be obtained independent of operating temperatures, age of the system, etc.

BRIEF DESCRIPTION OF THE DRAWINGS

The foregoing and other advantages and features of the invention will become more apparent from the detailed description of preferred embodiments given below, with reference to the accompanying drawings, in which the sole FIGURE is a schematic illustration of a wavelength division multiplexing (WDM) system constructed in accordance with one aspect of the present invention.

DETAILED DESCRIPTION OF PREFERRED EMBODIMENTS

Referring now to the drawings, where like reference numerals designate like elements, there is shown an optical system 10 for combining first and second light signals from first and second laser pumps 12, 14, and for transmitting a combined light signal through an output fiber (or other suitable waveguide) 16. The illustrated system 10 utilizes a WDM combiner 18. The pumps 12, 14 are connected to the input ports 20, 22 of the combiner 18 via respective optical fibers 24, 26. A broadband partial reflector (or other suitable feedback element) 28 is located within the output fiber 16, downstream from the output port 30 of the combiner 18.

In operation, the partial reflector 28 provides optical feedback for both (or all) of the pumps 12, 14. As a result, the pumps 12, 14 are efficiently locked to the acceptance bandpass wavelengths $\lambda_1$, $\lambda_2$ of the respective input ports 20, 22. In particular, the first input port 20 transmits light having a wavelength near $\lambda_1$ into the output fiber 16, and the second input port 22 transmits light having a wavelength near $\lambda_2$ into the output fiber 16, such that a combined light signal having both wavelengths $\lambda_1 + \lambda_2$ is propagated through the output fiber 16. The wavelengths $\lambda_1$, $\lambda_2$ may be different from each other.

A portion of the combined light ($\lambda_1 + \lambda_2$) is reflected by the partial reflector 28. The reflected portion of the combined light ($\lambda_1 + \lambda_2$) is routed back through the combiner device 18 (from right to left as shown in the drawings). The first input port 20 transmits only the portion of the combined light ($\lambda_1 + \lambda_2$) that has a wavelength near $\lambda_1$. Consequently, the first input port 20 strips away the second wavelength portion ($\lambda_2$) of the combined return signal, such that a return signal having the wavelength $\lambda_1$ is returned to the first laser pump 12. As a result of this feedback process, the first pump 12 is operationally locked at the wavelength $\lambda_1$ of the acceptance bandpass of the first input port 20.

In a similar manner, the second input port 22 strips away the first wavelength portion ($\lambda_1$) of the combined return signal, such that a return signal having the wavelength $\lambda_2$ of the acceptance bandpass of the second input port 22 is fed back to the second laser pump 14. Thus, the second pump 14 is automatically wavelength-locked at the wavelength $\lambda_2$ that has the least insertion loss at the second input port 22. In each case, the feedback spectrum is modified by the bandpass of the respective input port 20, 22 such that the largest feedback occurs for the first pump 12 at the first wavelength $\lambda_1$ and for the second pump 14 at the second wavelength $\lambda_2$.

In a preferred embodiment of the invention, the reflectivity of the broadband partial reflector 28 is sufficiently large such that the feedback operation causes the outputs of the pump lasers 12, 14 to be locked at the first and second wavelengths $\lambda_1$, $\lambda_2$. These are the lowest loss input wavelengths for the combiner 18 since they are determined by the bandpass wavelengths of the input ports 20, 22. Consequently, the lasing wavelengths of the pump lasers 12, 14 can be aligned and maintained at the lowest loss wavelengths for the combiner 18 independent of manufacturing tolerances and/or temperature variations.

Although the embodiment 10 shown in the drawings has only two pumps, the present invention should also be applicable to systems that have larger numbers of pumps, for example through multiple stage WDM combiners, or by employing combinations of polarization and WDM combiners. In any case, the broadband partial reflector 28 can be placed anywhere after the first WDM stage. The larger the combining loss between the pump lasers 12, 14 and the reflector 28, the larger the reflectivity of the reflector 28 needs to be to provide sufficient feedback to lock all of the input lasers 12, 14 to the desired wavelengths.

The combiner device 18 may be a periodic, fused-fiber device. Accordingly, to limit the lasing wavelengths of the lasers 12, 14 to the specific allowed wavelengths associated with the combiner device 18, the bandwidth of the partial reflector 28 may be limited so that feedback is provided only over the desired wavelength ranges. For example, the device 18 may have acceptance wavelengths of 1475 nanometers (nm) and 1485 nm at the first and second ports 20, 22, respectively, and also at 1495 nm and 1465 nm at the first and second ports 20, 22, respectively, if the latter wavelengths are within the gain spectrums of the respective lasers 12, 14. Therefore, in this example, the partial reflector 28 should not have significant reflectivity at 1465 nm and 1495 nm if it is desired to limit the combined output signal (on fiber 16) to only the 1475 nm and 1485 nm wavelengths. The present invention should not be limited, however, to the specific wavelength ranges identified above.

While preferred embodiments of the invention have been described and illustrated, it should be apparent that many modifications can be made to the preferred embodiments without departing from the spirit or scope of the present invention. Accordingly, the invention is not limited by the foregoing description or drawings, but is only limited by the scope of the appended claims.

What is claimed as new and desired to be protected by Letters Patent of the United States is:

1. An optical apparatus comprising:
   a wavelength division multiplexing device for combining first and second input light signals into a combined light signal; and
   a partial reflector for reflecting a portion of said combined light signal back through said wavelength division multiplexing device to affect the wavelengths of said first and second input light signals;
   an optical waveguide for transmitting said combined light signal, said partial reflector being located between said wavelength division multiplexing device and at least a portion of said optical waveguide; and
   wherein said wavelength division multiplexing device includes first and second input ports for receiving said first and second input light signals, and wherein the wavelengths of said first and second input light signals are locked by the acceptance bandpass characteristics of said first and second input ports.

2. The optical apparatus of claim 1, further comprising light sources for generating said first and second input light signals, said light sources being optically connected to said input ports of said wavelength division multiplexing device.

3. The optical apparatus of claim 2, further comprising optical fibers for transmitting said first and second input light signals from said light sources to said input ports of said wavelengths division multiplexing device.

4. The optical apparatus of claim 3, wherein the spectral characteristics of said input light signals are stabilized through said optical fibers from said light sources to said input ports.

5. The optical apparatus of claim 3, wherein said light sources include pump lasers.

6. An optical apparatus comprising:
   a wavelength division multiplexing device for combining first and second input light signals into a combined light signal; and
   a partial reflector for reflecting a portion of said combined light signal back through said wavelength division multiplexing device to affect the wavelengths of said first and second input light signals; and
   wherein said wavelength division multiplexing device includes a fused fiber structure.

7. A method of combining input light signals into a combined light signal, said method comprising the steps of:
   transmitting said input light signals through respective input ports of an optical combiner; and
   reflecting a portion of said combined light signal back into said combiner to provide feedback to affect the wavelengths of said input light signals; and
   wherein the wavelengths of said input light signals are affected by the spectral bandpass characteristics of said input ports.

8. A method of combining input light signals into a combined light signal, said method comprising the steps of:
   transmitting said input light signals through respective input ports of an optical combiner;
   reflecting a portion of said combined light signal back into said combiner to provide feedback to affect the wavelengths of said input light signals; and
   locking the wavelength characteristics of laser light sources as a function of the spectral bandpass characteristics of said input ports.

9. The method of claim 8, wherein said input light signals are generated by said laser light sources.

10. The method of claim 9, further comprising the step of transmitting said input light signals from said laser light sources to said inport ports of the optical combiner without spectrally modifying said input light signals.

11. The method of claim 10, wherein the wavelengths of said input light signals are different from each other.

12. The method of claim 11, wherein said combined light signal is applied to a telecommunications device.

13. A telecommunications system comprising:

optical sources for generating input light signals;

a wavelength division multiplexing device for combining said input light signals into a combined light signal, said device including input ports for inputting said input light signals and for outputting portions of said combined light signal, and wherein said device includes an output port for transmitting said combined light signal toward a telecommunications device; and a broadband partial reflector for reflecting a portion of said combined light signal back into said output port of said wavelength division multiplexing device, such that the wavelength characteristics of said optical sources are stabilized according to the bandpass characteristics of said input ports.

14. The telecommunications system of claim 13, further comprising optical fibers for transmitting said input light signals from said light sources to said input ports of said wavelength division multiplexing device.

15. The telecommunications system of claim 14, wherein the system is arranged such that no spectral filter is located in said optical fibers between said light sources and said input ports, such that the spectral characteristics of said input light signals in said fibers match the spectral characteristics of said input ports of said wavelength division multiplexing device.

16. The telecommunications system of claim 13, wherein said optical sources include pump lasers.

17. The telecommunications system of claim 16, wherein said wavelength division multiplexing device includes a fused fiber structure.

18. The telecommunications system of claim 16, wherein the reflectivity of said reflector is spectrally limited to prevent said sources from becoming locked at undesired wavelengths associated with said input ports.

* * * * *